United States Patent [19]

Take et al.

[11] Patent Number: 5,760,574
[45] Date of Patent: Jun. 2, 1998

[54] ENGINE REVOLUTION COUNTER HAVING MODE SETTING TERMINALS AND A DETACHABLE BODY

[76] Inventors: Shigeo Take; Hiromi Watanabe, both of c/o Oppama Industry Co., Ltd., 1-114, Oppamahoncho, Yososuka-shi, Kanagawa-ken, Japan

[21] Appl. No.: 327,101

[22] Filed: Oct. 21, 1994

[30] Foreign Application Priority Data

Oct. 21, 1993 [JP] Japan ................. 5-061423

[51] Int. Cl.$^6$ ................. G01P 3/481
[52] U.S. Cl. ................. 324/166; 324/156
[58] Field of Search ................. 324/207.11, 160, 324/166, 168, 169, 170, 171, 178, 156, 157

[56] References Cited

U.S. PATENT DOCUMENTS

| | | | |
|---|---|---|---|
| 3,383,587 | 5/1968 | Tripp | 324/156 |
| 3,835,382 | 9/1974 | Weisbart | 324/169 |
| 5,091,695 | 2/1992 | Shaland | 324/170 |
| 5,177,432 | 1/1993 | Waterhouse et al. | 324/166 |

*Primary Examiner*—Walter E. Snow
*Attorney, Agent, or Firm*—Bauer & Schaffer

[57] ABSTRACT

An engine revolution counter comprising a mount 2 having first electric source terminals 20 for supply of electric power from outside and first measuring mode setting terminals 21 through 23, and a measuring part main body 1 provided on said mount in freely attachable and detachable way and having measuring mode setting switches and a display panel 11 on the front face thereof to display measured results and also having a measuring function of the number of revolution of the engine, wherein the first electric source terminals 20 and the first measuring mode setting terminals 21 through 23 are connected to each of second electric source terminals 16 and second measuring mode setting terminals 17 through 19 provided in said measuring part main body 1.

6 Claims, 7 Drawing Sheets

ENGINE REVOLUTION COUNTER HAVING MODE SETTING TERMINALS AND A DETACHABLE BODY

FIELD OF THE INVENTION

The present invention relates to a counter of engine revolution for use in the measurement of the number of revolutions of a gasoline engine having from one cylinder up to twelve cylinders, for example.

BACKGROUND OF THE INVENTION

A meter for detecting the rotating speed of an engine, i.e. a tachometer is normally installed on the display part of the dashboard of the vehicle so that a driver can directly read the number of revolutions of the engine when the vehicle is stopped or driven.

Further, an analog display is usually used to display the number of revolutions of the engine. For a digital display, a segmented bar display or a pattern display at 100 rpm internal, for example, is used. It can be said that such displays suffice practically for monitoring of the driving situation and the like.

However, for special vehicles such as racing cars, for example, there are cases where the driver and/or mechanic wants to determine, at real time, the number of revolutions of the engine in more detail and to monitor from within the car or from outside the car the engine. Particularly, there are cases where the driver wants to monitor the number of revolutions of the engine as well as lap time, split time, a current clock, total driving time and the like. It is, however, difficult for the ordinary tachometer installed in the vehicles to meet these objects.

SUMMARY OF THE INVENTION

The present invention aims at solving the aforementioned problems, and therefore, the object of the present invention is to provide an engine revolution counter capable of simultaneously displaying the number of revolutions of the engine as well as other necessary measured data such as lap time, split time, and the like.

The counter according to the present invention comprises a mount having first electric source terminals for supplying electric power from outside and first measuring mode setting terminals, a main body for the measuring parts which is freely removably attachable to a mount and having mode setting switches on the periphery thereof. A display for the measured results is located on the central front portion of the body. Second electric source terminals connectable to the first electric source terminals and second measuring mode setting terminals connectable to the first measuring mode setting terminals are provided in the main body.

The engine revolution counter according to the present invention is capable of showing the number of revolutions of the engine on the display which may be a liquid crystal panel or the like. Such capability may also be possible even in night time by flashing the back light by electric power supplied from the outside through the first electric source terminals via the second electric source terminals. The tachometer is also capable of showing the desired mode data by switching operation of each measuring mode switch after the main body is installed onto the mount and also to obtain the display of engine revolutions and desired mode data, similarly as mentioned above, by electric power supplied from the internal battery after the body is removed from the mount.

Thus, according to the present invention, the engine counter can be operated in a vehicle or form outside of the vehicle and is capable of providing simultaneously the number of engine revolutions as well as desired measurement data such as the lap time and the split time of the vehicle.

DETAILED DESCRIPTION OF THE PREFERRED EMBODIMENT

Figure 1:
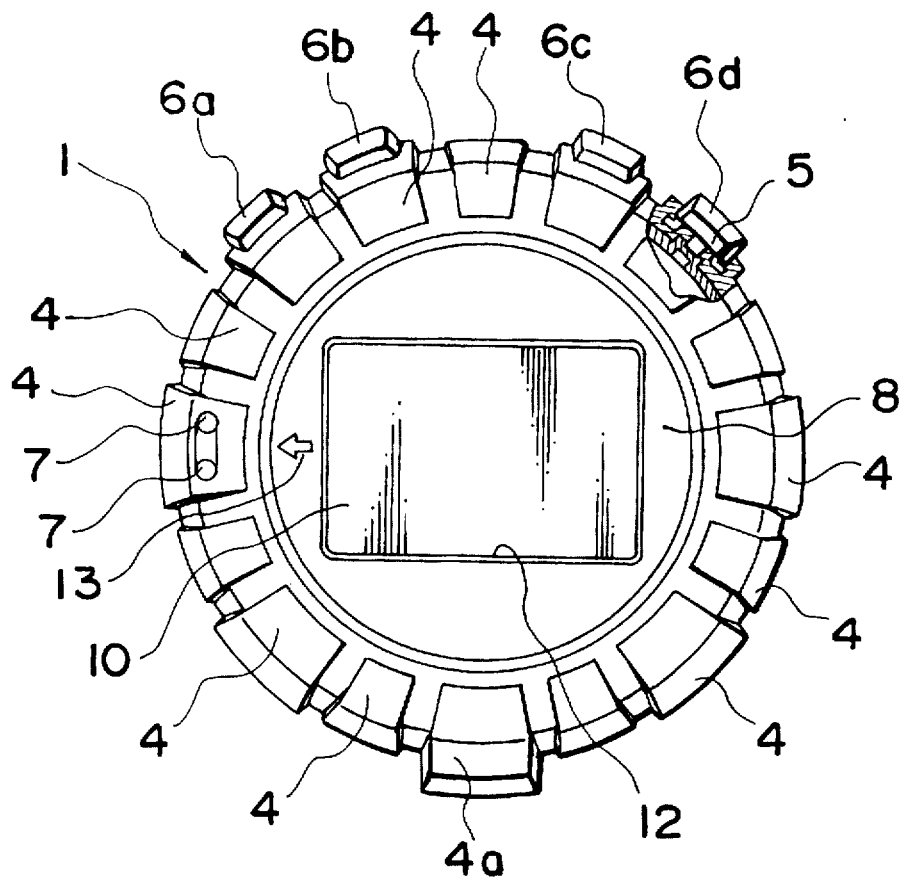
FIG. 1 is a front view showing an engine revolution counter according to one embodiment of the present invention.
Figure 2:
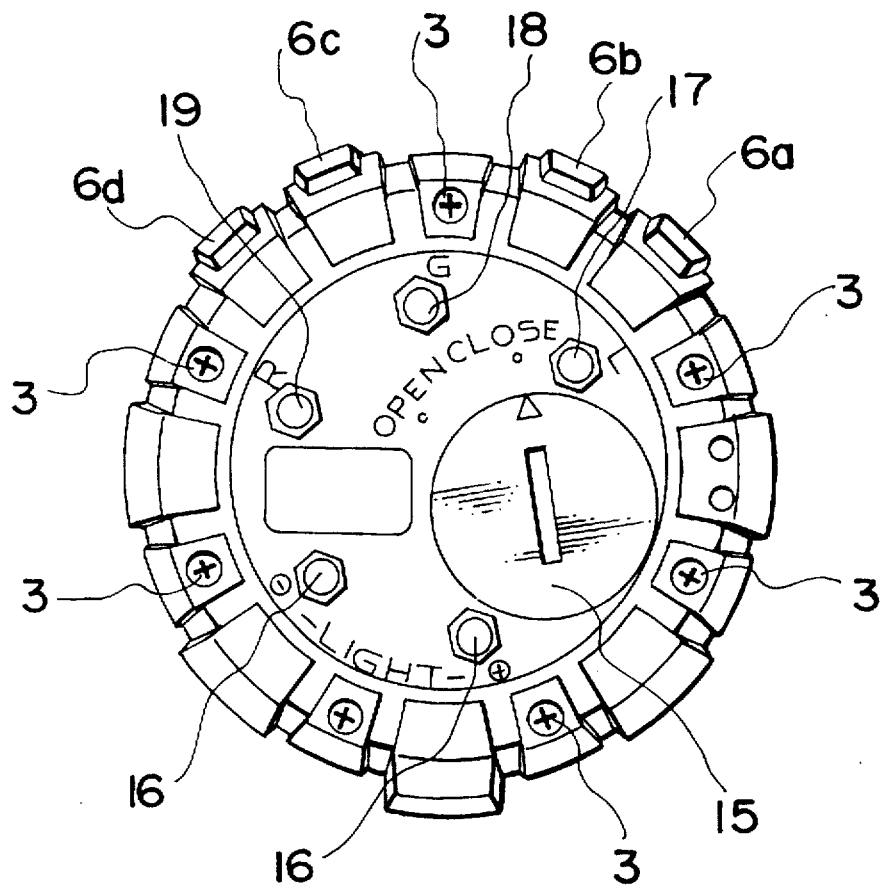
FIG. 2 is a back view of the main body of the engine revolution counter shown in FIG. 1.
Figure 3:
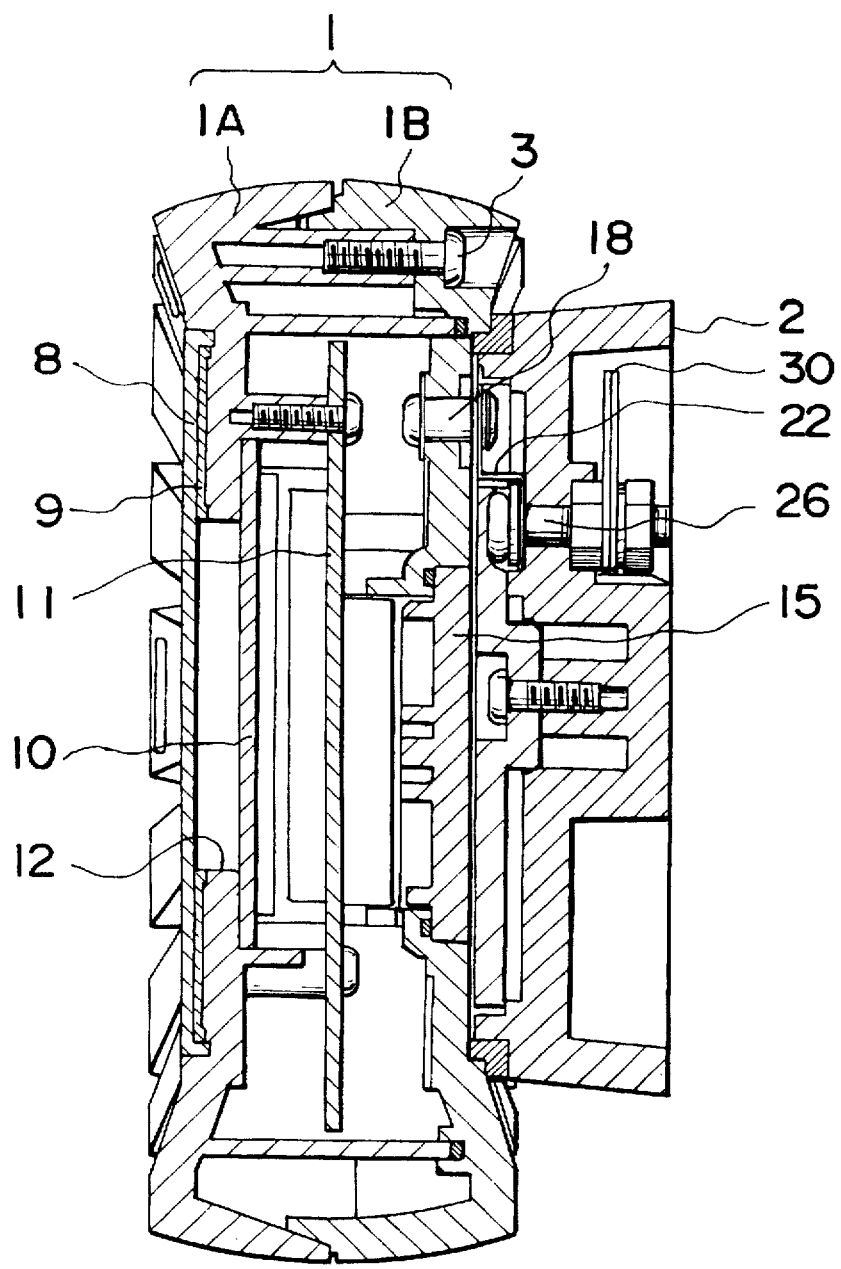
FIG. 3 is a cross sectional view showing the counter according to the present invention.

In FIGS. 1 through 5, a main body 1 for housing the measuring parts is shown. The body has an almost round or circular shape, a mount 2 to be freely attachable and detachable. The main body 1 comprises front case member 1A and a back case member 1B which are assembled to each other at several positions by screws 3 in a way of disassembled.

The front case 1A is provided with a central rectangular window 12 and has an overall shape similar to a vehicle tire, having several treads 4 continuously about its peripheral edge and surface.

Various operational switches (not shown in the drawings) are located within the body through an exterior operational bottom 5, and measuring mode setting switch buttons 6a to 6d are provided on and protrude from selected ones of the treads 4.

Antenna lead holes 7 are provided through one of the treads 4. Inside the body 1 near the lead holes 7 are provided an induction coil (not shown in the drawings) to induce and receive the ignition pulse signals from the antenna lead and a micro-processor (not shown in the drawing) to compute the number of revolutions.

A protective windshield plate 8 is provided in the center of the front case 1A. An almost ring-shaped face plate 9, on which is indicated the information relating to the operation of the device such as measuring modes to be selected by the mode setting switch buttons 6c to 6d; the unit for the revolution number; operational directions as well as the number of manufacturer; and the like, is provided on the inside face of the plate 8.

Inside the face plate 9, a display panel 10 such as a liquid crystal panel or the like is provided to display the number of revolutions of the engine, time, and current clock, and further inside of the display panel 10 a circuit substrate plate 11 is provided so as to connect to the induction coil, switches, battery and the like.

A directional arrow 13 indicating the position of the induction coil and displayed is provided near the antenna lead holes 7 on the wind-breaking plate 8. One of the treads is used as a holder for a cord.

In the back case 1B, a battery cover 15 is provided in order to house an internal battery as a power source within the body. Also provided are second electric source terminals 16 for a back light capable of showing the number of revolutions of the engine and the like displayed on the display panel 10 of the measuring part main body 1 even at nighttime. Second measuring mode setting terminals 17 through 19 are directly connected to each of the said measuring mode setting circuits within the body. These terminals 16 through 19 are formed so as to have a washer on their round bar stem.

Figure 4:
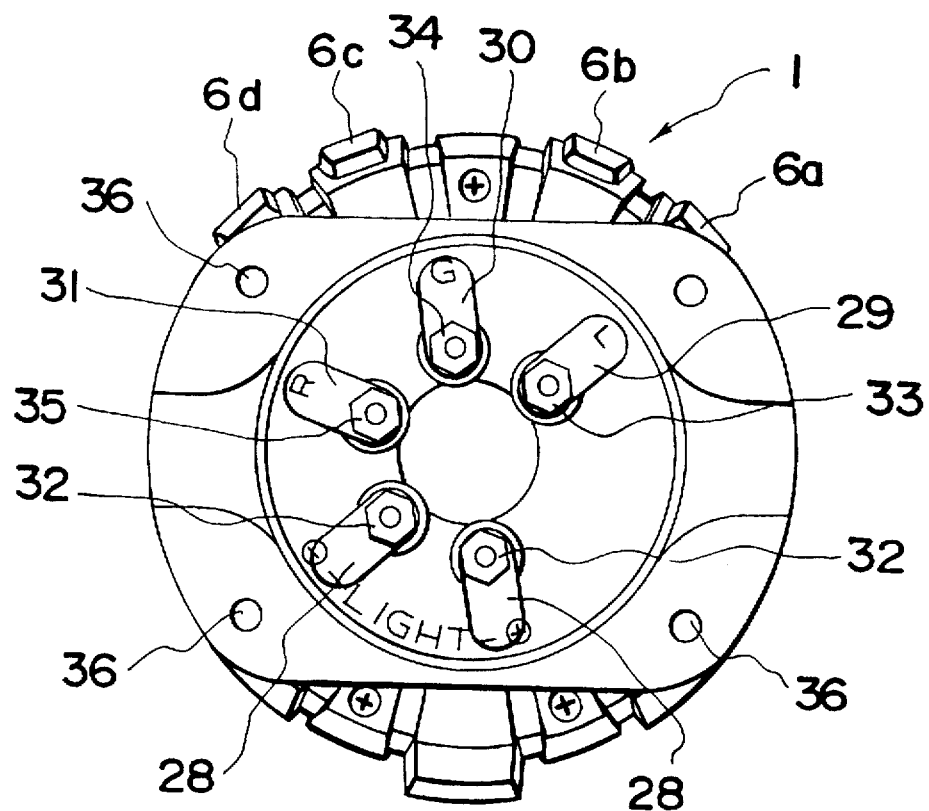
FIG. 4 is a back view showing the counter according to the present invention.
Figure 5:
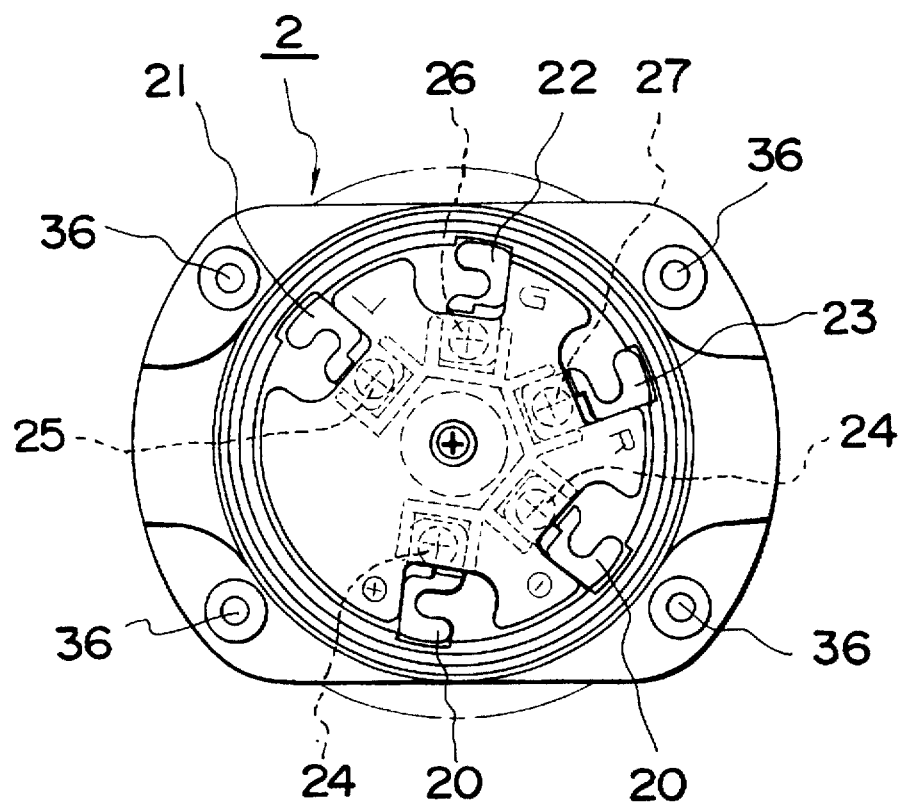
FIG. 5 is a front view of a mount of the counter shown in FIG. 3.
Figure 6:
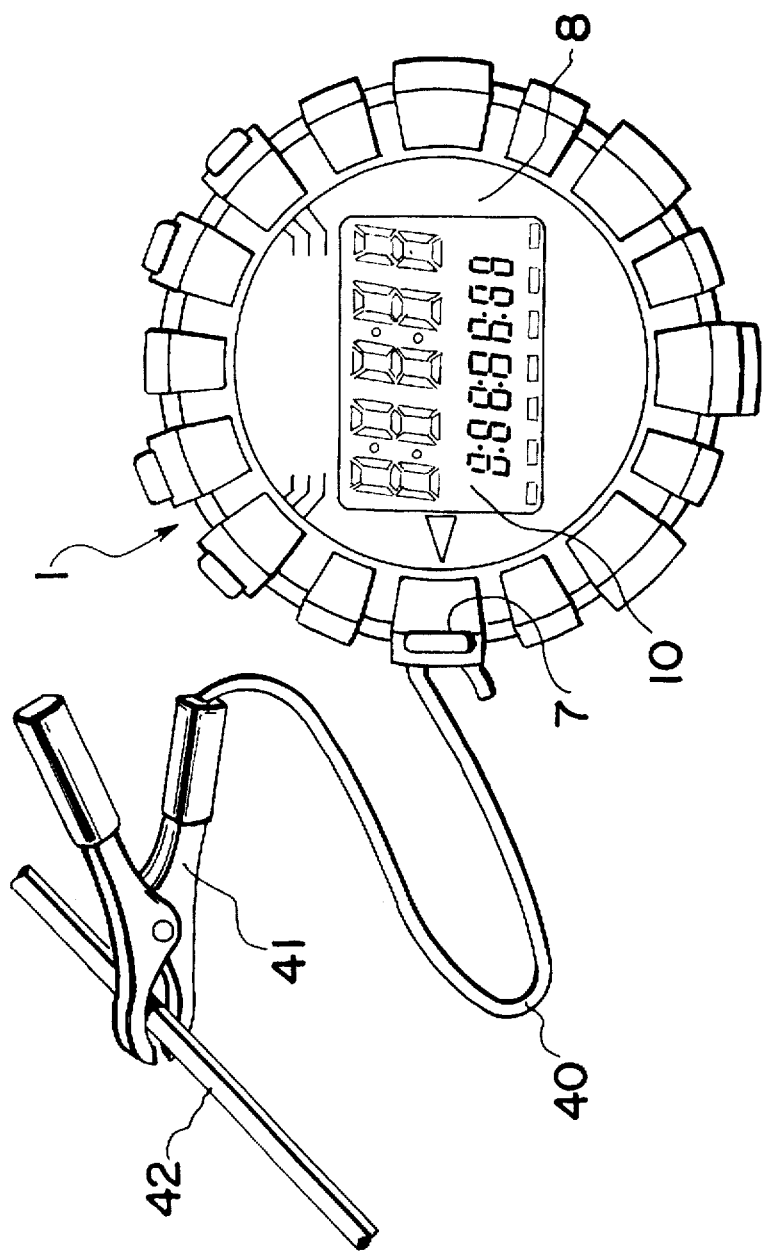
FIG. 6 is an illustration showing the method of use of the engine revolution counter according to the present invention.

The back and front faces of the mount 2 are shown in FIGS. 4 and 5, respectively. On the front face, first electric source terminals 20 and first measuring mode setting terminals 21 to 23 are provided in order to engage with each of terminals 16 through 19 once the measuring part main body 1 is placed securely on the mount 2. Each of the terminals 20 through 23 are fixed in the mount 2 by means of attaching screws 24 through 27.

The end of each of the attaching screws 24 through 27 protrudes to the back face of the mount 2. On each of these protruded ends lug terminal assemblies 28 through 31 are fixed by one of nuts 32 through 35 as shown in FIG. 4. The mount 2 is fixed in place by screws or bolts passing through holes 36.

In the engine revolution counter thus constructed, ignition pulse during rotation of the engine is led to the induction coil in the main body 1 by placing the main body 1, formed either unitarily with the mount 2 or separately, against the mount 2 so that the arrow mark 13 is caused to come close to the ignition cable (not shown in the drawings) connected to a spark plug or by placing the same in advance on the selected place in the engine room.

As a result, the number of revolutions of the engine can be computed by the micro-processor (not shown in the drawings) from the number of pulses determined by the counter, shown on the display panel 10 and read through the wind-breaking plate 8 from outside.

Further, in addition to the number of revolutions of the engine, other data such as the lap time, split time, driving time (based on a stop watch), current clock and other time data can be displayed independently or at same time.

On the other hand, since the main body 1 can be removed from the mount 2, if one end of the antenna lead 40 is inserted into the antenna lead holes 7 of the tread part 4 so as to be held thereby and another end of the antenna lead 40 is connected to one of ignition cables through a crocodile clip 41 attached to the other end of the antenna lead 40, the number of revolutions of the engine can be determined from the ignition pulse of the number of revolutions in similar way as mentioned above.

Further, in order to attach the main body 1 to the mount 2 again, the main body 1 may be placed on the mount 2 and turned the same so that each of terminals 16 through 19 of the measuring part main body 1 is engaged to the connecting terminals 20 through 23 of the mount 2.

Figure 7:
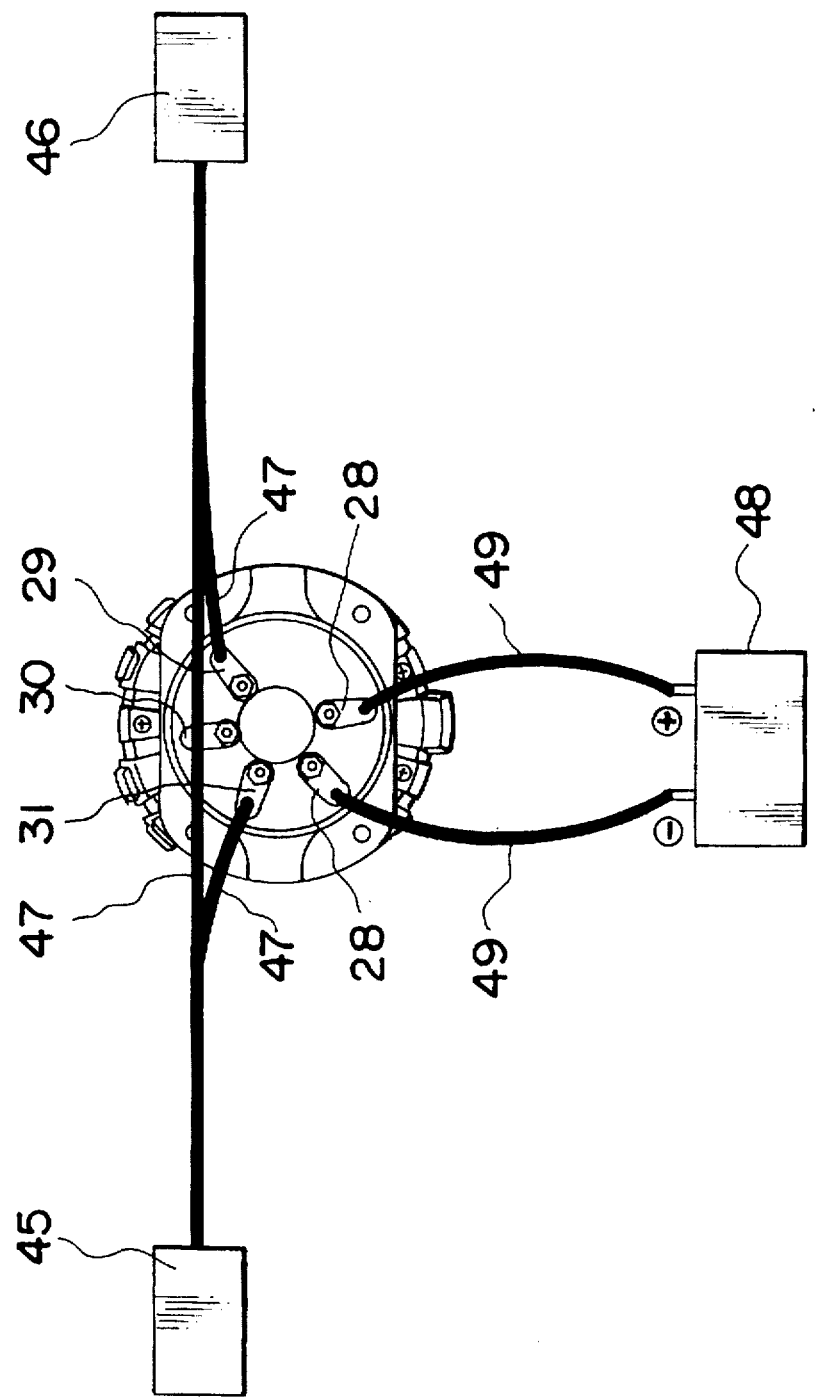
FIG. 7 is an illustration showing one example of use of the engine revolution counter according to the present invention.

Furthermore, if it is necessary to attach the main body 1 on the steering wheel operated by the driver, for example, the main body 1 may be removed from the mount 2 and fixed in the appropriate place near the central part of the steering wheel while, as shown in FIG. 7, each of switches 45 and 46 is connected to lug terminal assemblies 29, 30 and 31 shown in FIG. 4 through leads 47, and the other two lug terminal assemblies 28 for power source are connected to a vehicle battery 48 through leads 49.

For example, to attach the main body 1 to a steering wheel operated by a driver, the main body 1 and the mount 2 is fixed in an appropriate place, preferably near the center of the steering wheel. As shown in FIG. 7, each of the measuring mode setting switches 45, 46 is connected to lug terminal assemblies 29, 30 and 31 shown in FIG. 4 through leads 47 and the other lug terminal assemblies 29, 30 and 31 shown in FIG. 4 through leads 47 and the other lug terminal assemblies 28 for an external power source are connected to the vehicle battery 48 through leads 49. The switches 45, 46 are mounted in a convenient location for operation by a driver, for example, on the periphery of the steering wheel. A suitable antenna may be inserted in the holes 7 to allow measurement of the engine r.p.m. The driver can then monitor the display of the number of revolutions of the engine and operate each of the switches 45 and 46 while still holding the steering wheel with both hands so that necessary data for driving such as lap time and the like can be shown on the display panel 10.

By attaching and connecting the counter, the driver can monitor the display of the number of revolution of the engine as mentioned above and operate each of the switches 45 and 46 by his finger while holding the steering wheel so that necessary data for driving such as said lap time, split time, and the like can be shown on the display panel 10.

We claim:

1. A counter for determining engine revolution and displaying as a function thereof various operational mode data such as lap time and split time, comprising a mount attachable to a fixed support member, said mount having first electric source terminals for the supply of electric power, a plurality of first measuring mode setting terminals and external switches to which said first measuring mode setting Terminals are connected, a housing body having a plurality of mode setting switches arranged about its periphery, a display panel on its front face, means within said body for determining the revolution of the engine, and second mode setting terminals connectable to each of said first electric source terminals and said first measuring mode setting terminals, said mount and said housing having cooperating thread members for detachably connecting said mount and housing.

2. The counter as claimed in claim 1, wherein the pulses are sensed by an induction coil and include means for mounting a lead which can transmit said pulses adjacent to said inductive coil.

3. A counter as claimed in claim 2, wherein the means for mounting a lead comprises a number of holes through which said lead may be passed.

4. The counter as claimed in claim 1, comprising lighting means for illuminating said display means, said lighting means being electrically connected to selected first terminal means, for the supply of an external electrical source thereto.

5. The counter as claimed in claim 4, wherein display means are operated by switch operating members arranged peripherally of said main body part.

6. The counter as claimed in claim 4, further having an internal battery.

* * * * *